US009514621B2

(12) United States Patent
Herron et al.

(10) Patent No.: US 9,514,621 B2
(45) Date of Patent: Dec. 6, 2016

(54) TACTILE SENSORY UNDERWATER COMMUNICATION DEVICE

(71) Applicants: Raven-Rose A. Herron, Round Mountain, TX (US); Joe D. Herron, Round Mountain, TX (US)

(72) Inventors: Raven-Rose A. Herron, Round Mountain, TX (US); Joe D. Herron, Round Mountain, TX (US)

(*) Notice: Subject to any disclaimer, the term of this patent is extended or adjusted under 35 U.S.C. 154(b) by 0 days.

(21) Appl. No.: 14/592,331

(22) Filed: Jan. 8, 2015

(65) Prior Publication Data

US 2016/0203683 A1 Jul. 14, 2016

(51) Int. Cl.

| | |
|---|---|
| ***H04B 3/36*** | (2006.01) |
| ***G08B 6/00*** | (2006.01) |
| ***G04G 9/00*** | (2006.01) |
| ***G04G 21/00*** | (2010.01) |

(52) U.S. Cl.
CPC *G08B 6/00* (2013.01); *G04G 9/00* (2013.01); *G04G 21/00* (2013.01)

(58) Field of Classification Search
CPC ............. G08B 6/00; G08B 7/06; G04G 21/08; G04G 9/0064; G06F 3/016
USPC ....................................................... 340/407.1
See application file for complete search history.

(56) References Cited

U.S. PATENT DOCUMENTS 6,580,664 B2 * 6/2003 Magnusson ............ G04G 21/04 368/223
2012/0188848 A1 7/2012 Choe et al.
2013/0082963 A1 * 4/2013 Chu ........................ G03B 17/08 345/173
2013/0154826 A1 * 6/2013 Ratajczyk ................ G08B 7/06 340/539.11
2015/0009784 A1 * 1/2015 Cho ........................ G04G 21/08 368/224

* cited by examiner

*Primary Examiner* — Don N Vo
(74) *Attorney, Agent, or Firm* — Dale J. Ream

(57) ABSTRACT

A tactile sensory underwater communication device includes a waterproof housing defining an interior area. A circuit and a battery electrically coupled thereto are situated in the interior area of the housing. An electrically conductive probe is electrically connected to the circuit and extends away from a bottom wall of the housing, the probe being configured to deliver an electric shock when electrically energized. The communication device includes a receiver configured to receive a signal indicative of an intention to energize the probe, the circuit being configured to enable current from the battery to energize the probe when the signal is received. A timekeeping device is positioned in the interior area of the housing, the timekeeping device having a timekeeping circuit and a digital display electrically connected to the battery and the timekeeping circuit. A receiver is situated in said interior area and electrically connected to said circuit, said receiver.

12 Claims, 7 Drawing Sheets

TACTILE SENSORY UNDERWATER COMMUNICATION DEVICE

BACKGROUND OF THE INVENTION

This invention relates generally to communications devices and, more particularly, to a tactile sensory underwater communications device that alerts a wearer of a wrist based device with a momentary static electric shock.

Persons swimming underwater, such as recreational or professional scuba divers, desire to communicate with others in their group. For instance, one diver may desire to get the attention of one or more other divers in his group in order to direct their attention to an underwater object or, more importantly, to warn of danger or a present emergency. More particularly, one diver may desire to alert other divers if he is experiencing difficulty with his breathing apparatus, if a shark or other predator has been spotted, or if it is simply time to return to the surface of the body of water.

Various devices have been proposed for delivering an alert such as energizing a light or delivering an audible tone or even a voice transmission to another diver's headphones. Although assumably effective for their intended purposes, the existing devices are largely ineffective if the water is murky or if the divers are separated from one another.

Therefore, it would be desirable to have a tactile sensory underwater communications device that includes an electrically conductive probe that delivers a mild electrostatic shock to a user's skin when energized so as to alert the user. Further, it would be desirable to have a tactile sensory underwater communications device that is capable of both sending and receiving an alert signal. In addition, it would be desirable to have a tactile sensory underwater communications device that includes a digital time keeping device.

SUMMARY OF THE INVENTION

A tactile sensory underwater communication device according to the present invention includes a waterproof housing defining an interior area. A circuit and a battery electrically coupled thereto are situated in the interior area of the housing. An electrically conductive probe is electrically connected to the circuit and extends away from a bottom wall of the housing, the probe being configured deliver an electric shock when electrically energized. The communication device includes a receiver configured to receive a signal indicative of an intention to energize the probe, the circuit being configured to enable current from the battery to energize the probe when the signal is received. A timekeeping device is positioned in the interior area of the housing, the timekeeping device having a timekeeping circuit and a digital display electrically connected to the battery and the timekeeping circuit. A receiver is situated in said interior area and electrically connected to said circuit, said receiver.

Therefore, a general object of this invention is to provide a tactile sensory underwater communication device that alerts a wearer with a momentary static electric shock.

Another object of this invention is to provide an underwater communication device, as aforesaid, that transmits an ultrasonic signal when an input button is actuated by a user.

Still another object of this invention is to provide an underwater communication device, as aforesaid, that includes a digital timekeeping device.

Yet another object of this invention is to provide an underwater communication device, as aforesaid, that includes an electrically conductive probe extending between a housing and a user's skin that delivers a shock when energized.

A further object of this invention is to provide an underwater communication device, as aforesaid, that receives a signal transmitted from a remote communication device indicative of an instruction to energize the probe.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1A:
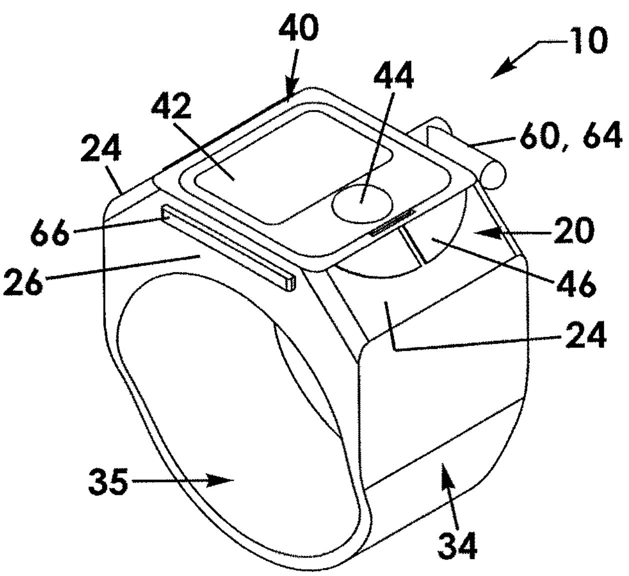
FIG. 1*a* is a perspective view of a tactile sensory underwater communications device according to a preferred embodiment of the present invention illustrated with an antenna in a stowed configuration.

A tactile sensory underwater communications device according to the present invention will now be described with reference to FIGS. 1*a* to 7 of the accompany drawings. The communications device 10 includes a waterproof housing 20, a timekeeping device 40, a transmitter 58 and receiver 62, and an electrically conductive probe 48 configured to deliver a static electric shock to a person's skin when energized while worn by the person.

Figure 2:
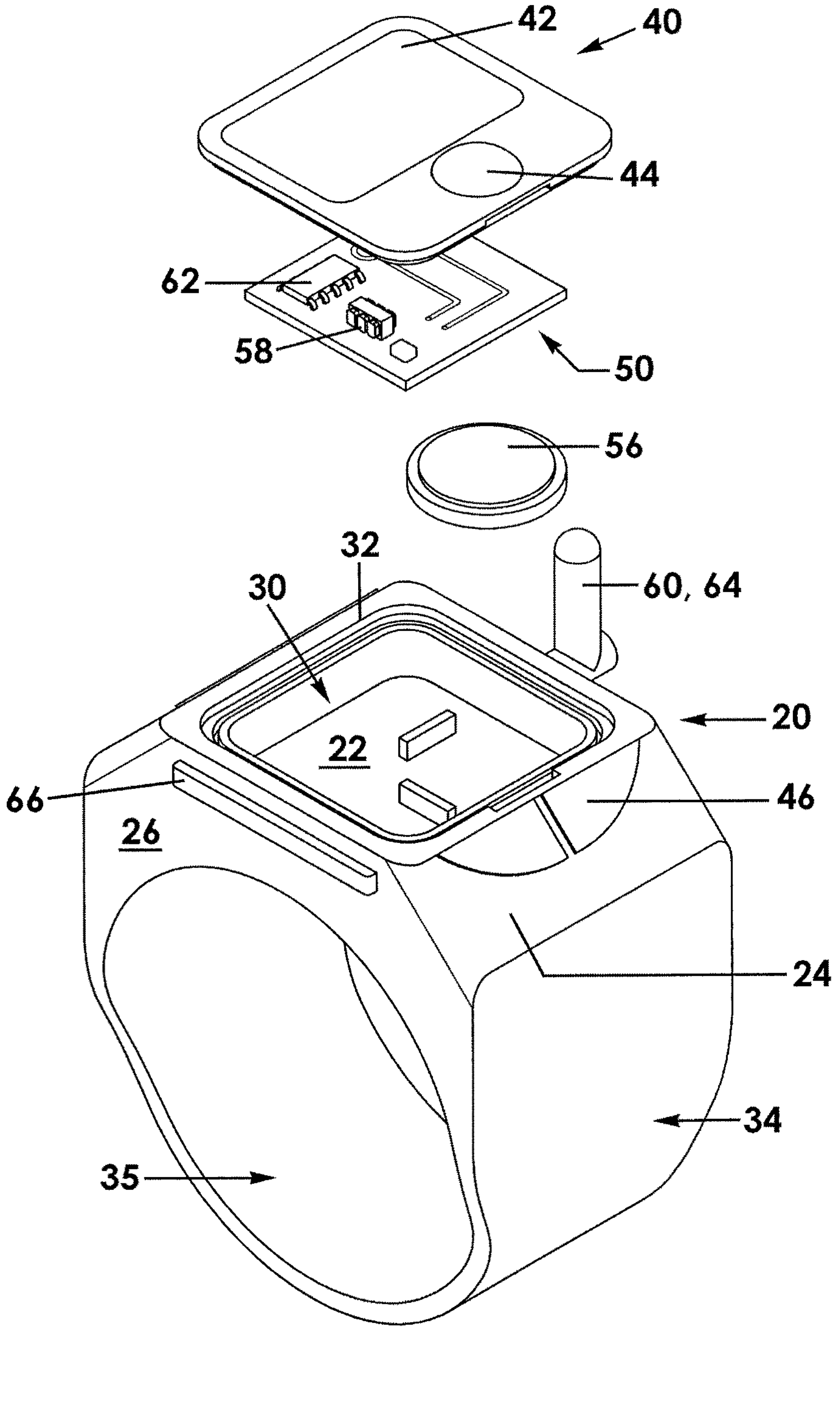
FIG. 2 is an exploded view of the underwater communications device as in FIG. 1*b;*

The housing 20 includes a bottom wall 22, opposed side walls 24, and opposed front 26 and rear 28 walls that, together, define an open interior area 30 (FIG. 2). The housing 20 is constructed of a waterproof material as there will be electronic components situated in the interior area 30 as will be described below. When disassembled, the housing 20 defines an open top 32 giving access to the interior area 30.

Figure 1B:
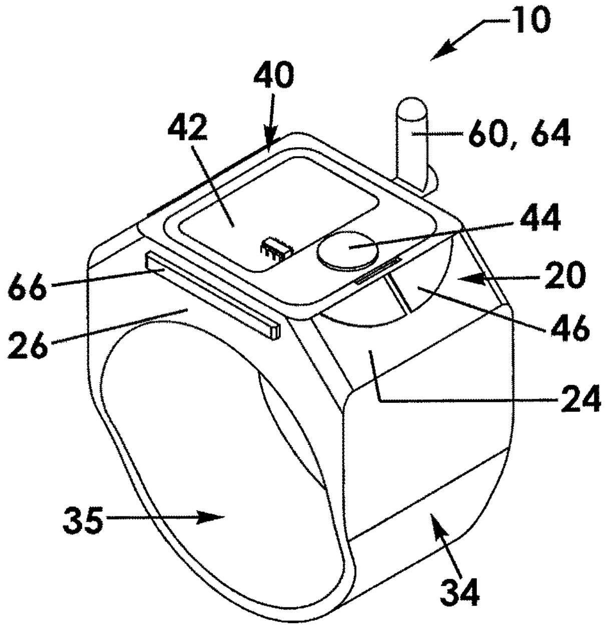
FIG. 1*b* is a perspective view of the underwater communications device as in FIG. 1*a* illustrated with the antenna in a deployed configuration.

A battery 56 is positioned in the interior area 30. A control circuit 50, also referred to as "circuitry" is situated in the interior area 30 and electrically connected to the battery 56. The control circuit 50 may include a transmitter 58 and a receiver 62 or a combination of the two, i.e. a transceiver (FIG. 2). The control circuit 50 is configured to actuate the transmitter 58 to emit a predetermined signal and is configured to cause the receiver 62 to receive an incoming signal, as will be described in more detail later. A first antenna 62 is in data communication with the receiver 62 to enhance the reception of a signal and a second antenna 60 is electrically connected to the transmitter 58 and configured to enhance the strength of a transmitted signal. The signal may be an ultrasonic signal capable of traveling through water effectively. In some embodiments, the first antenna 62 and second antenna 64 may be included in the same antenna housing or, alternatively, be a singular antenna. The antenna is pivotal between a stowed configuration (FIG. 1*a*) and a deployed configuration (FIG. 1*b*). In some embodiments, the control circuit 50 may be supplemented, incorporated into, or replaced by a processor and memory having programming instructions as will be described later.

A timekeeping device 40 is situated in the interior area 30 of the housing 20. The timekeeping device 40 may have its own supplemental circuitry specifically adapted for keeping time and other features of a traditional digital watch. The timekeeping device 40 includes a digital display 42 electrically connected to the battery 56. The timekeeping circuitry may be configured to continuously deliver time data to the display 42. The display 42 completely covers the open top 32 of the housing 20 and is configured to prevent water from entering the interior area 30. It is understood that the entire timekeeping device 40 may be removed from the interior area 30, such as to replace the battery 56.

Figure 7:
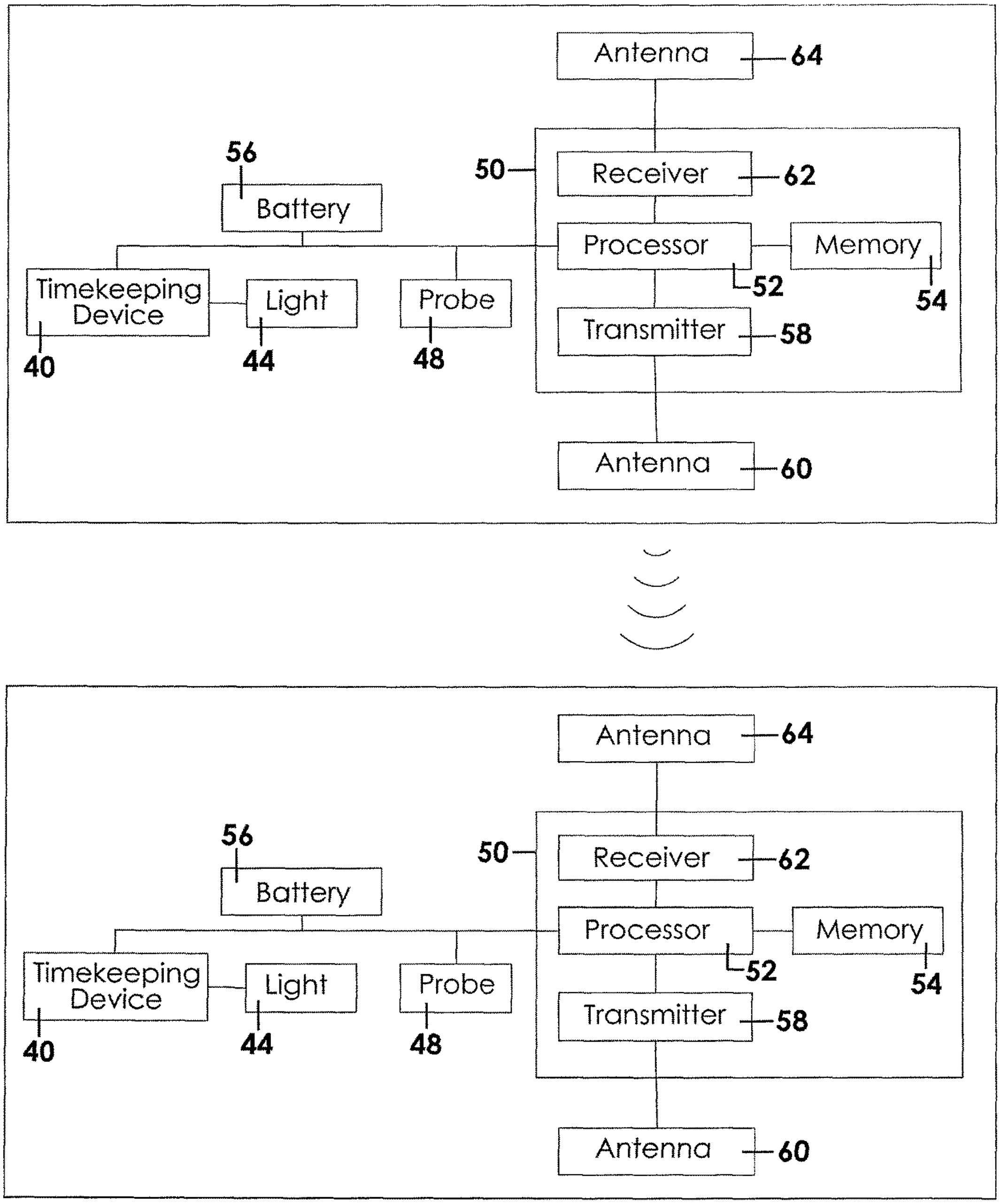
FIG. 7 is a block diagram illustrating the electronic components of the present invention.

The timekeeping device 40 may include a light 44, such as a light emitting diode. The light 44 is positioned adjacent the digital display 42 (FIG. 1*b*) and is electrically connected to the battery 56 (FIG. 7). In some embodiments, the light 44 may be actuated by pressing the light 44 itself. Alternatively, the timekeeping device 40 includes other input buttons 46 electrically connected to the control circuit 50 or directly to the battery 56 which are configured to enable current to be delivered from the battery 56 to the light 44 when operated. The input buttons 46 may also be configured in conjunction with the control circuit 50 to control timekeeping functions.

Figure 4:
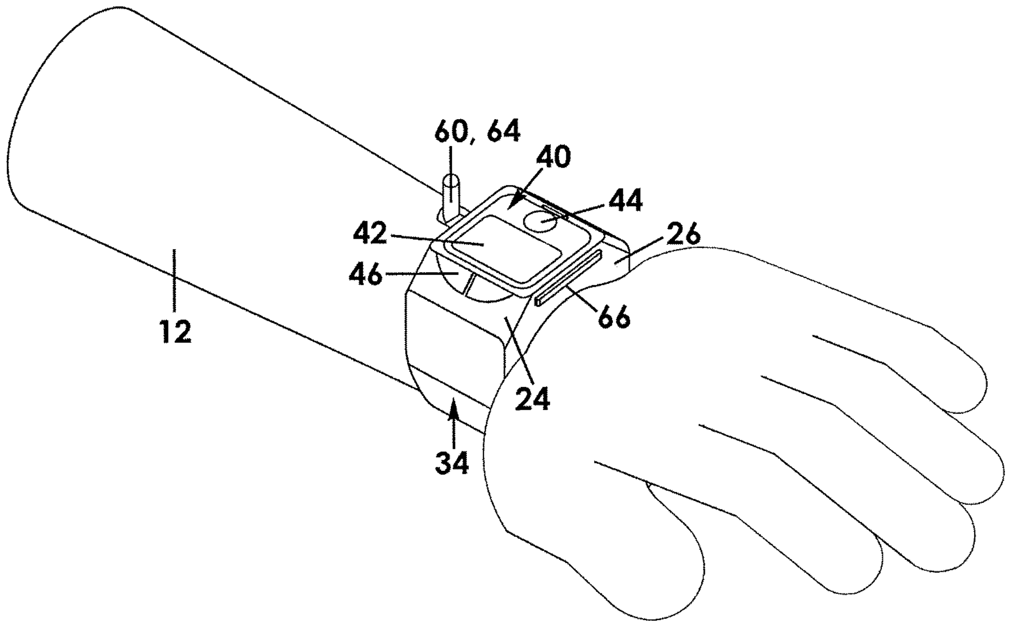
FIG. 4 is a perspective view of the underwater communications device as in FIG. 1*b* illustrated being worn on the wrist of a person.
Figure 5:
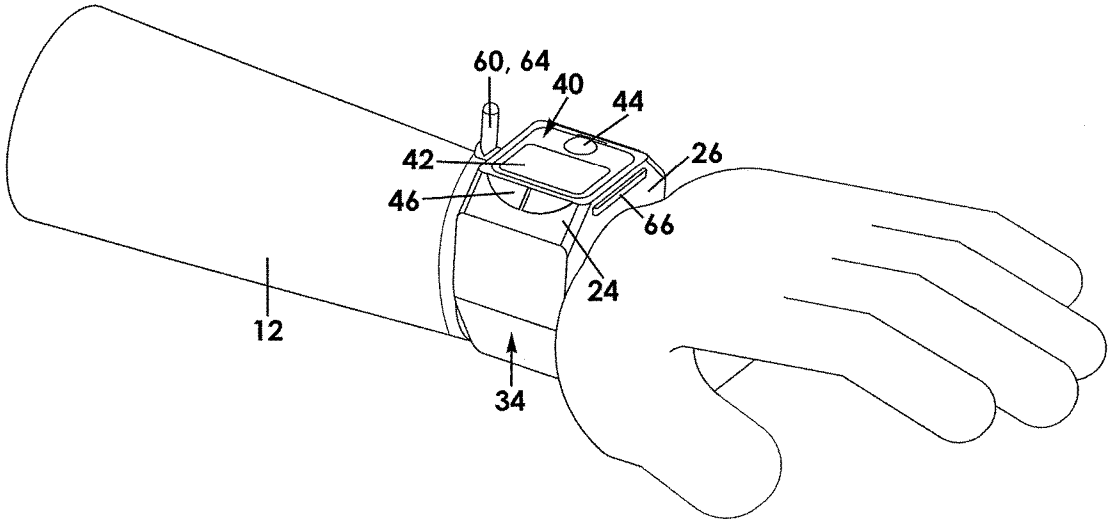
FIG. 5 is a perspective view of the underwater communications device as in FIG. 4 according to an alternative embodiment of the present invention having a sealing sleeve.

The communications device 10 may include means for attaching the housing 20 to a human body, such as a person's wrist 12. In some embodiments, a connection strap 34 is integrally attached to the housing 20 and extends in a loop (FIG. 1). Specifically, opposed ends of the connection strap 34 extend between opposed side walls 24 of the housing 20 such that the connection strap 34 and bottom wall 22 of the housing 20 define an open space 35 having a diameter sufficient to receive a person's hand and wrist therethrough. In some embodiments, the connection strap 34 may be constructed, in whole or in part, of an elastic or other resilient material such that a relatively tight friction fit engagement is maintained between the wearer's skin and the connection strap 34 and bottom wall 22 of the housing 20 (FIG. 4). In another embodiment (not shown), the connection strap 34 may include a first portion and a second portion that are selectively coupled together with a clasp in the manner of some watchbands.

Figure 3:
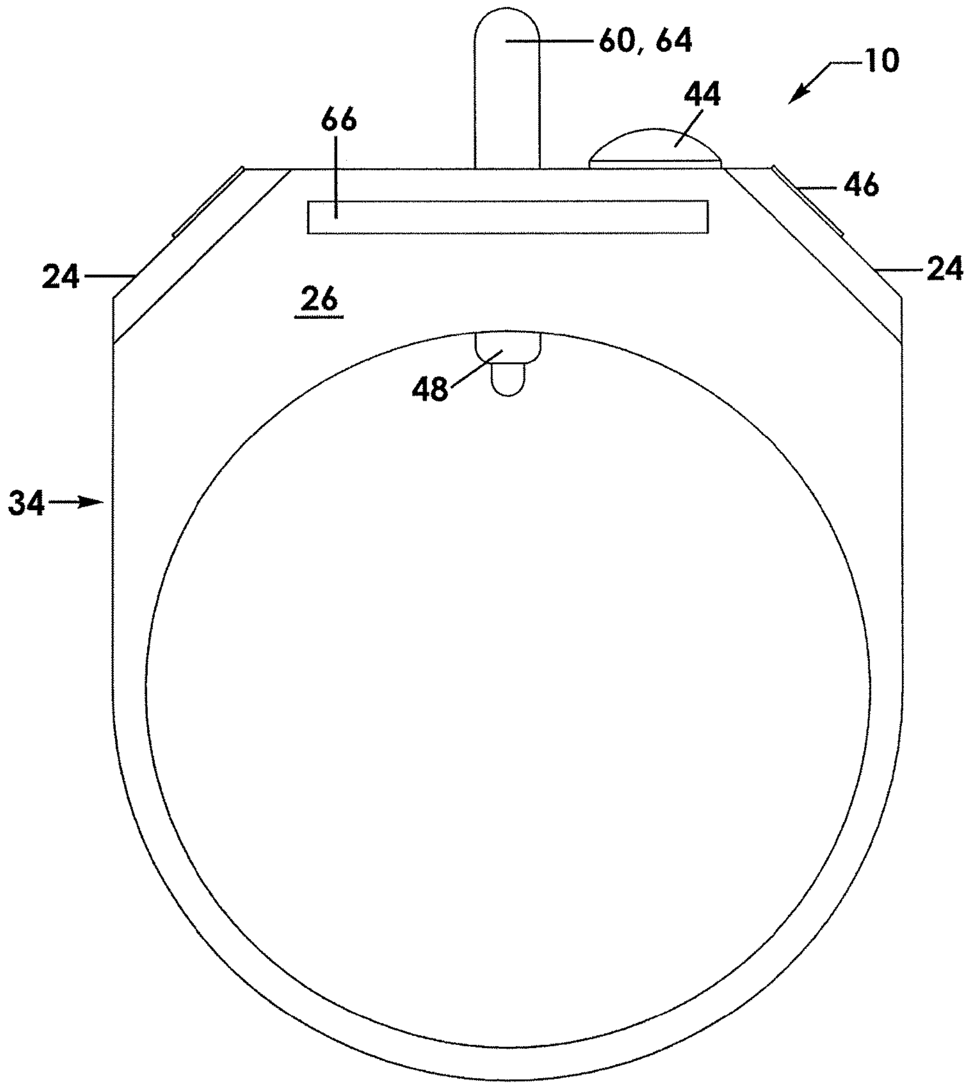
FIG. 3 is a side view of the underwater communications device as in FIG. 1*b;*
Figure 6A:
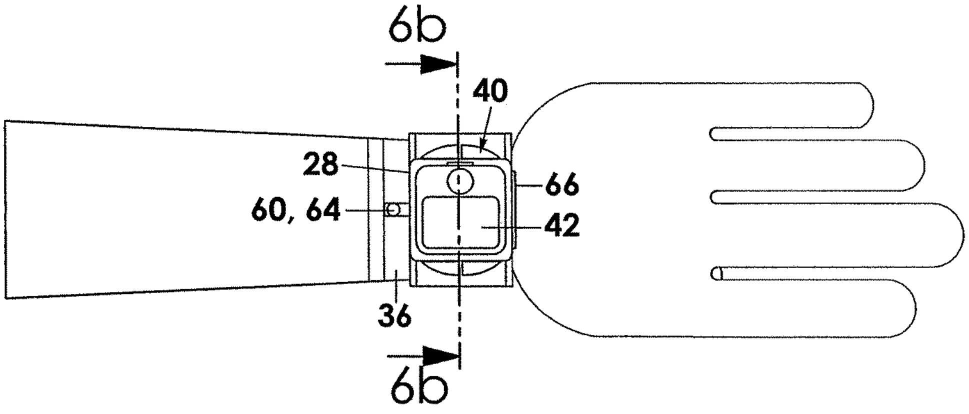
FIG. 6*a* is a top view of the underwater communications device as in FIG. 5.
Figure 6B:
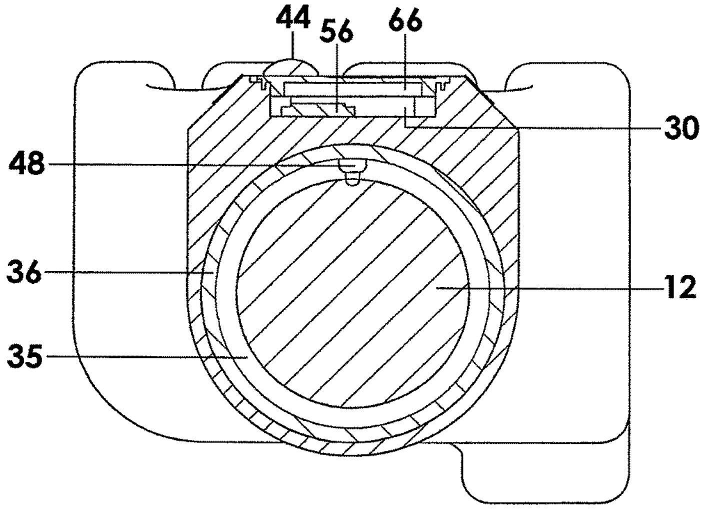
FIG. 6*b* is a sectional view taken along line 6*b*-6*b* of FIG. 6*a*.

The communications device 10 may include a conductive "probe" 48 electrically connected to the battery 56 and to the control circuit 50. The probe 48 extends from the bottom wall 22 of the housing 20 and into the interior space 35 defined by the connection strap 34 (FIG. 3). Accordingly, the probe 48 is in direct contact with the skin of a person's wrist when the connection strap 34 is positioned on the wrist of a person (FIG. 6). The probe 48 is configured to deliver a static electric "shock" when selectively energized, a static electric shock providing a tactile alert but not harming a person who receives it.

An input button 66 may be positioned on an exterior wall of the housing 20, such as the front wall 26, and is in electrical communication with the control circuit 50 and battery 56. The control circuit 50 is configured to cause current from the battery 56 to be delivered to the electric probe 48 when the input button 66 is pressed.

In some embodiments, a sleeve 36 may be coupled to a side edge of the connection strap 34 immediately adjacent the open space 35 defined thereby. The sleeve 36 is configured to inhibit water from entering into the open space 35 when attached or surrounding a person's wrist. Preferably, the sleeve 36 provides a watertight seal such that water does not come into contact with the probe 48 that selectively delivers an electric shock to the wearer's skin. In some embodiments, the sleeve 36 may extend outwardly from each side of the connection strap 34 so as to prevent water from entering the open space 35 from either side of the connection strap 34.

Returning now to operation of the transmitter 58 and receiver 62, the receiver 62 is configured to receive an ultrasonic signal that has been transmitted through air or water, such as a signal transmitted by the transmitter 58 of another tactile sensory underwater communications device 10. The control circuit 50 is coupled to the receiver 62 and is configured to process the received signal. Upon receipt of a predetermined signal indicative of an instruction to generate an alert, the control circuit 50 causes or enables electrical current to flow from the battery 56 to the probe 48, causing the probe 48 to deliver an electrostatic shock to the skin of a wearer of the housing 20.

Similarly, the control circuit 50 is configured to actuate a respective transmitter 58 to emit a predetermined signal into the air or water when the input button 66 is pressed by a user. Specifically, when a user pushes the input button 66, the control circuit 50 energizes the transmitter 58 to send a predetermined signal that is indicative of an instruction to a remote receiver 62 to energize a respective probe 48 and, as a result, alert a remote user to take a predetermined action, to ascertain if there is an emergency condition, or the like.

In some embodiments, the control circuit 50 may include a processor 52 and memory 54 in data communication with one another and electrically connected to the battery 56. The predetermined signal (such as a frequency, a code identifier, or the like) may be stored in memory 54 along with programming instructions. In operation, there is programming in memory 54 that, when executed by the processor 52, causes the processor 52 to deliver current to energize the probe 48 to deliver an electrostatic shock. Similarly, there is programming in memory that, when executed by the processor 52 causes the processor 52 to actuate the transmitter 58 to emit a signal when the input button 66 is actuated. The transmitted signal is indicative of an intention to energize the probe 48 of a remote communications device 10.

In an embodiment, the memory 54 may include data structures in which different signal frequencies may be associated with respective users. In this embodiment, the input button 66 may be used to select which user (and which signal) is sent by transmitter 58 when actuated. For instance, the input button 66 may be pressed an associated number of times or the choice may be selected from choices displayed on the timekeeping device display 42. Accordingly, an alert signal is only sent to a communications device 10 associated with a single user or group of users.

In use, a user, such as a scuba diver, may insert his hand through the open space 35 of a connection strap 34 such that the housing 20 is situated on his wrist 12. Preferably, the sleeve 36 seals water out of the interior space 35 of the connection strap 34 and user's wrist such that the probe 48 extending from the underside of the housing 20 remains dray. Then, when a signal indicative of an alert is received by the receiver 62 (such as a signal sent by a remote communications device 10), the probe 48 delivers a momentary electrostatic shock that can be felt by the user. In addition, the user may press the input button 66 to actuate the transmitter 58 to emit a signal indicative of an alert and that can be received by a remote communications device 10 (such as may be worn by another diver). Other users may similarly attach similar communications devices 10 to their wrists 12, respectively. All of the divers may then submerge into a body of water, such as an ocean, sea, lake, or the like.

It is understood that while certain forms of this invention have been illustrated and described, it is not limited thereto except insofar as such limitations are included in the following claims and allowable functional equivalents thereof.

The invention claimed is:

1. A tactile sensory underwater communication device, comprising:

a waterproof housing defining an interior area;

a control circuit and a battery electrically connected to said circuit and together situated in said interior area of said housing;

an electrically conductive probe electrically coupled to said control circuit and extending away from a bottom wall of said housing, said probe configured to deliver an electric shock when energized;

a receiver situated in said interior area and electrically connected to said control circuit, said receiver configured to receive a signal indicative of an instruction to energize said probe, said control circuit being configured to cause current from said battery to energize said probe when said signal is received;

a timekeeping device positioned in said interior area of said housing, said timekeeping device having a timekeeping circuit and a digital display electrically connected to said battery, said timekeeping circuit configured to deliver time data to said display;

a transmitter situated in said interior area of said housing and electrically connected to said control circuit;

an input member situated on an exterior surface of said housing and electrically connected to said control circuit, said control circuit configured to cause said transmitter to transmit a shock signal when said input member is actuated;

a connection strap extending between opposed sides of said housing, said connection strap defining an open space configured to selectively attach said housing to a human body;

a sleeve coupled to a side edge of said connection strap adjacent said open space defined thereby, said sleeve configured to seal water from entering into said open space defined by said connection strap.

2. The tactile sensory underwater communication device as in claim 1, wherein:

said control circuit is associated with a predetermined individual identification code;

said shock signal is indicative of said identification code such that said identification code is transmitted by said transmitter when energized.

3. The tactile sensory underwater communication device as in claim 1, wherein said probe imparts a static electric shock when energized.

4. The tactile sensory underwater communication device as in claim 1, comprising:

a first antenna electrically connected to said receiver and configured to enhance signal reception by said receiver; and a second antenna electrically connected to said transmitter and configured to enhance signal transmission by said transmitter.

5. The tactile sensory underwater communication device as in claim 1, comprising a connection strap having opposed first and second portions coupled to and extending away from opposed sides of said housing, said connection strap configured to selectively attach said housing to a human body.

6. The tactile sensory underwater communication device as in claim 1, comprising a light adjacent said display of said timekeeping device configured to selectively illuminate said display when energized.

7. The tactile sensory underwater communication device as in claim 1, comprising a light adjacent said display of said timekeeping device configured to selectively illuminate said display when energized.

8. The tactile sensory underwater communication device as in claim 1, wherein said signal is an ultrasonic signal.

9. The tactile sensory underwater communication device as in claim 1, wherein said control circuitry includes:

a processor electrically connected to said battery;

a memory electrically connected to said processor that includes programming;

programming in said memory that when executed by said processor causes said processor to deliver current from said battery to energize said probe when said signal is received by said receiver.

10. The tactile sensory underwater communication device as in claim 9, further comprising programming in said memory that when executed by said processor causes said processor to actuate said transmitter to selectively transmit a shock signal.

11. The tactile sensory underwater communication device as in claim 10, wherein:

said memory includes a plurality of data structures storing data that associates a predetermined signal frequency with a respective user;

said input member configured for selecting a respective user to whom a signal is to be sent; and programming in said memory, that when executed by said processor, causes said processor to actuate said transmitter to selectively transmit a respective signal frequency associated with a selected respective user.

12. A tactile sensory underwater communication device, comprising:

a waterproof housing defining an interior area;

a control circuit and a battery electrically connected to said circuit and together situated in said interior area of said housing;

an electrically conductive probe electrically coupled to said control circuit and extending away from a bottom wall of said housing, said probe configured to deliver an electric shock when energized;

a receiver situated in said interior area and electrically connected to said control circuit, said receiver configured to receive a signal indicative of an instruction to energize said probe, said control circuit being configured to cause current from said battery to energize said probe when said signal is received;

a timekeeping device positioned in said interior area of said housing, said timekeeping device having a timekeeping circuit and a digital display electrically connected to said battery, said timekeeping circuit configured to deliver time data to said display;

a processor electrically connected to said battery;

a memory electrically connected to said processor that includes programming;

programming in said memory that when executed by said processor causes said processor to deliver current from said battery to energize said probe when said signal is received by said receiver;

a transmitter situated in said interior area of said housing and electrically connected to said control circuit;

an input member coupled to said housing and in electrical communication with said control circuit;

programming in said memory that when executed by said processor causes said processor to actuate said transmitter to selectively transmit a shock signal upon actuation of said input member;

wherein:

said memory includes a plurality of data structures storing data that associates a predetermined signal frequency with a respective user;

said input member configured for selecting a respective user to whom a signal is to be sent; and programming in said memory, that when executed by said processor, causes said processor to actuate said transmitter to selectively transmit a respective signal frequency associated with a selected respective user.

* * * * *